United States Patent [19]
Okamoto et al.

[11] Patent Number: 5,855,937
[45] Date of Patent: Jan. 5, 1999

[54] WATER-IN-OIL TYPE EMULSIFYING FATS AND OILS FOOD HAVING SPLIT SECTION LAYERS AND METHOD OF MANUFACTURING SAME

[75] Inventors: Kiyotaka Okamoto; Yoshihiko Honda, both of Sapporo; Mototake Murakami, Sayama, all of Japan

[73] Assignee: Snow Brand Milk Products Co., Ltd., Hokkaido, Japan

[21] Appl. No.: 737,219

[22] PCT Filed: Sep. 22, 1995

[86] PCT No.: PCT/JP95/01918

§ 371 Date: Mar. 6, 1997

§ 102(e) Date: Mar. 6, 1997

[87] PCT Pub. No.: WO96/28037

PCT Pub. Date: Sep. 19, 1996

[30] Foreign Application Priority Data

Mar. 16, 1995  [JP]  Japan .................................... 7-057433

[51] Int. Cl.$^6$ ................ A23D 7/00; A23D 9/04
[52] U.S. Cl. .................... 426/76; 426/516; 426/603
[58] Field of Search ................ 99/537; 425/382.4; 426/76, 530, 518, 516, 512, 603

[56] References Cited

U.S. PATENT DOCUMENTS

| | | | |
|---|---|---|---|
| 1,952,698 | 3/1934 | Willem | 426/76 |
| 3,526,162 | 9/1970 | Willcox | 426/518 |
| 4,735,566 | 4/1988 | Squicciarini | 426/518 |
| 5,053,241 | 10/1991 | Mongeau | 426/518 |
| 5,223,276 | 6/1993 | Djordjevic et al. | 425/382.4 |
| 5,621,972 | 4/1997 | Sala | 83/648 |

FOREIGN PATENT DOCUMENTS 2209171  4/1989  United Kingdom .

*Primary Examiner*—Carolyn Paden
*Attorney, Agent, or Firm*—Griffin, Butler, Whisenhunt & Szipl, LLP

[57] ABSTRACT

A conventional water-in-oil type emulsifying fats and oils food is extruded from a nozzle at a particular shear rate to provide therein split section layers composed of thin water film layers and the like. Accordingly, the food can be readily split even when it is taken out from a refrigerator immediately before use, and prevention of deterioration in quality and improvement of productivity are attained.

16 Claims, 6 Drawing Sheets

WATER-IN-OIL TYPE EMULSIFYING FATS AND OILS FOOD HAVING SPLIT SECTION LAYERS AND METHOD OF MANUFACTURING SAME

BACKGROUND OF THE INVENTION

1. Field of the Invention

The present invention relates to water-in-oil type emulsifying fats and oils food having split section layers composed of thin water film layers formed therein and a method of manufacturing the same. This water-in-oil type emulsifying fats and oils food can be readily split even in a low temperature state immediately after it has been taken out from a refrigerator. Accordingly, the food is very useful as household table fats and oils, fats and oils for cooking purpose, or as raw fats and oils for commercial use.

2. Prior Art

Typical examples of water-in-oil type emulsifying fats and oils food include butter, margarine and spread. The manners in which they are used are various. For household use, it is used as cooking material or as table fats and oils to be spread on bread or the like. For commercial consumption such as in the field of confectionery or baking, it is used as raw fats and oils to be kneaded into dough.

Butter is manufactured by a process comprising steps of aging cream at a temperature of +13° C. for approximately 8 hours, churning this to form soybean-sized butter lumps, and kneading them together by working to achieve a uniform texture.

Margarine or spread is manufactured by a process comprising steps of hardening animal or vegetable fat or oil such as palm oil, safflower oil, bean oil, colza oil, coconut oil, lard or fish oil directly or through hydrogenation, adding emulsifier to prepare an oil-phase, mixing this oil-phase with a water-phase consisting of water, emulsifier, stabilizer or skimmed milk and flavoring ingredients such as spicery until emulsification is achieved, and quenching the mixture under kneading with use of suitable device such as pin-machine or botator. The water-in-oil type fats and oils food manufactured by each of the above-mentioned processes may be classified into hard type and soft type by the basis of the solid fat index (SFI) of the particular fats and oils. The water content of such food may be in a relatively wide range of approximately 15–50% by weight.

The water-in-oil type emulsifying fats and oils food manufactured as has been described above is packaged in a specific manner depending upon its purpose of use. For example, butter or margarine of hard type for household use is packaged typically in a unit weight in order of 112.5 g, 225 g or 450 g. Butter or margarine of soft type also for household use is packed in a cup-shaped container typically in a unit weight in order of 250 g or 450 g. On the other hand, so-called commercial consumption water-in-oil type emulsifying fats and oils food to be used as raw material in the field of confectionery or baking is packed in a corrugated cardboard box with interposition of suitable film typically in a unit weight of 20 kg or 30 kg. The water-in-oil type emulsifying fats and oils food is usually maintained at a refrigeration temperature (approximately 5° C.) during storage or transport. While the water-in-oil type emulsifying fats and oils food is soft and fluid immediately after it has been manufactured, glyceride contained therein is solidified as this food is refrigerated and results in rapid increase of its hardness no matter whether it is of hard type or of soft type. Accordingly, the water-in-oil type emulsifying fats and oils food which has just been taken out from a refrigerator presents the state of a block which is too hard to be easily split or partially cut off to be used. Particularly in the case of the hard type, it is a usual practice in many households to leave the food of this type taken out from the refrigerator at a room temperature for a period until it becomes sufficiently soft enough to be split easily. Also in the case of the commercial consumption water-in-oil type emulsifying fats and oils food, it is a conventional measure to wait for appropriate rise in the temperature of the food before it is sliced by means of a slicer.

However, such practice of partially splitting the water-in-oil type emulsifying fats and oils food to be used after it has been taken out from the refrigerator and left at a room temperature until it is soften is inconvenient in that the quality as well as the taste cannot avoid deterioration, since the food surface has been more or less molten even if trouble is taken to put the unused portion of the food back into the refrigerator. In the case of so-called commercial consumption water-in-oil type emulsifying fats and oils food, considerably long time is required to raise the temperature of the food before slicing and the operation of slicing also requires much time and labor. This inevitably affects productivity.

In view of the problems as have been described above, it is a principal object of the invention to provide water-in-oil type emulsifying fats and oils food so improved that the food can be readily split even when it is taken out from a refrigerator immediately before use.

DISCLOSURE OF THE INVENTION

The inventors have found that the object set forth above can be achieved by providing water-in-oil type emulsifying fats and oils food with split section layers and thereby facilitating the food to be easily split. More specifically, the invention provides water-in-oil type emulsifying fats and oils food having therein split section layers composed of thin water film layers along which the food can be readily split. The invention also provides water-in-oil type emulsifying fats and oils food formed with a cavity between each pair of adjacent water-in-oil type emulsifying fats and oils separated by each split section layer. Further, the invention provides water-in-oil type emulsifying fats and oils food formed with grooves in their outer surface along a split line defined between each pair of adjacent water-in-oil type emulsifying fats and oils separated by each split section layer. The invention provides also a method of manufacturing such water-in-oil type emulsifying fats and oils food having the split section layers comprising steps of extruding fluid water-in-oil type emulsifying fats and oils food at a shear rate of 4.0 s$^{-1}$ higher from a nozzle while a quantity of water contained therein is extricated so as to form thin water layers and preferably freezing water-in-oil type emulsifying fats and oils food having the split section layers thus extruded from the nozzle.

The nozzle used in the method as has been described may be a square nozzle having straightening vanes therein, or a circular nozzle comprising a coaxial multipipe nozzle or a circular nozzle having straightening vanes therein. Said straightening vane may have its cross-section formed at the vertical middle or top and bottom with thereof transversely paired projections. In other words, the straightening vane may be in the form of a plate including a difference in level.

The term "split section layers" used herein should be understood as layers composed of thin water layers extending in the water-in-oil type emulsifying fats and oils food longitudinally as well as transversely or any desired directions along which the food can be readily split.

Accordingly, it will be obviously understood that the thin water layers do not necessarily mean perfectly continuous layers but may be partially interrupted by fats and oils.

The water-in-oil type emulsifying fats and oils food such as butter, margarine or spread is composed of a continuous oil phase and a dispersed water phase. A quantity of water presenting the water phase is substantially uniformly dispersed in the oil phase in the form of particles each having an average size in a range of 1–15 μm. According to the invention, the quantity of water thus dispersed in the oil phase is extricated and locally concentrated so as to form the thin water layers as the split section layers in the food. Specifically, the water-in-oil type emulsifying fats and oils food still in a fluid state is supplied to a nozzle which, in turn, squeezes water partially from the oil phase and thereby extricates and locally concentrates it so as to form the thin water layers.

The water-in-oil type emulsifying fats and oils food in fluid state includes, for example, non-refrigerated butter immediately after it has been manufactured by aging, churning and working of cream as raw material, or butter which has been refrigerated for storage in the form of a block but thereafter fluidized through processing by a butter homogenizer. The fluid butter manufactured by such a method as has been described above has a water-content approximately in a range of 15–17% by weight. In the case of margarine, it is fluid immediately after the oil phase and the water phase have been emulsified followed by quenching and kneading with use of appropriate device such as pin-machine or botator. Such margarine may be classified depending upon its solid fat index (SFI) into hard type and soft type. The water-content of such margarine is in a range of 18–50% by weight.

The nozzle used in the invention is not limited to any particular configuration and may be selectively configured depending on a shape of the expected product so far as it can provide a shearing force. Specifically, the nozzle may be a square nozzle as shown by FIGS. 1 and 3 or a circular nozzle as shown by FIG. 6. In the case of the square nozzle, its body is polygonal, for example, rectangular or square in cross-section and its outlet has a cross-section slightly smaller than the cross-section of the body. Within the body there may be provided a single or plural straightening vane so as to extend in the direction of product flow. Each of these straightening vanes may be selected depending on the expected configuration of the final product, for example, from among plate-like vanes as shown by FIGS. 1 and 3, the vane of plate-like but presenting transversely paired projections in its cross-section at the vertical middle thereof so as to form a difference in level as shown by FIG. 8, or vane of the plate-like presenting transversely pared projections in its cross-section at top and bottom thereof so as to also form a difference in level as shown by FIG. 10. Although not shown in figure, the straightening vane (4) may be in the form of square pillar, cylindrical pillar, semicylindrical pillar, trigonal pillar or rhombic pillar. The plate-like straightening vane having a difference in level as viewed in its cross-section shown by FIG. 8 comprises a main plate member (4a) and a pair of narrower plate members (4b) assembled to said main plate member (4a) on both sides thereof at a vertically middle height so as to define a difference in level on each side of the vane. The plate-like straightening vane having a difference in level as viewed in its cross-section comprises a main plate member (4a) and a pair of narrower plate members (4b) assembled to said main plate member (4a) on its both sides at top and bottom so as to define a difference in level on each side of the vane. In the case of the straightening vane presenting semicylindrical projection, cavity or groove is made in the form of semicylindrical. The circular nozzle may comprise a single pipe or may comprise a coaxial multipipe (12) as shown by FIG. 6 and within these single pipe or the coaxial multipipe the straightening vanes of the above-mentioned configuration are applicable. It is also possible as will be seen in FIG. 7, to provide a spiral straightening vane (13) similar to a static mixer. With the nozzle having the straightening vanes therein, a cross-sectional area of the nozzle outlet is preferably dimensioned to be slightly smaller than a cross-sectional area of the nozzle body. However, the cross-sectional area of the nozzle outlet may be the same as the cross-sectional area of the nozzle body depending on the particular configuration of packaging or the particular shear rate.

As will be apparent from FIGS. 8 and 10, the straightening vane presenting the projections on both sides in its cross-section has a difference in level between the top and bottom wall sections of the same thickness. Such difference in level generates the previously described cavity or groove.

It should be understood that the location as well as the configuration of each narrower plate member (4a) are not limited to those shown in FIGS. 8 and 10 and may be selected depending on an expected configuration of the product so long as it is arranged to define said difference in level.

The number of the nozzles is not limited to one, and one and same equipment may be provided with a plurality of orifices of nozzles through which the product may be extruded.

Now a method of manufacturing the inventive water-in-oil type emulsifying fats and oils food having the split section layers will be specifically described.

Fluid water-in-oil type emulsifying fats and oils food is supplied by suitable extruding means such as a butter pump or a plunger pump to said nozzle through which the food is extruded at a shear rate of 4.0 $s^{-1}$ or higher. At a shear rate lower than 4.0 $s^{-1}$, the desired quantity of water contained in the oil phase can not be squeezed and concentrated on the wall surfaces. As a result, the thin water layers can not be formed. Result of the experiments is shown in Table 1.

TABLE 1

Result of experiments

| | | Conditions | | |
| --- | --- | --- | --- | --- |
| Expr. No. | Flow rate kg/h | No. of splits | Cross-section (w × h)cm | Shear rate $s^{-1}$ | State of split |
| 1 | 13 | 3 | 2.5 × 2.5 | 0.5 | Not split along layers and split section irregular |
| 2 | 20 | 3 | 2.5 × 2.0 | 1 | Not split along layers and split section irregular |
| 3 | 40 | 3 | 2.5 × 2.0 | 2 | Not split along layers and split section irregular |
| 4 | 60 | 3 | 2.5 × 2.0 | 3 | Split along layers but split section partially irregular |
| 5 | 80 | 3 | 2.5 × 2.0 | 4 | Split along layers and split section planar |
| 6 | 160 | 3 | 2.5 × 2.0 | 8 | Split sharply along layers and split section planar |

While an upper limit of the shear rate is not specified here, it is important to utilize a shear rate being able to avoid the apprehension of change in structure of fats and oils and the swelling of the product as soon as it is discharged into the atmosphere, thereby disturbing and destroying the thin water layers. Such shear rate is in order of 1500 $s^{-1}$.

In the case of the nozzle provided with a plurality of the straightening vanes therein, the continuous oil phase is divided by the extruding effect into the number corresponding to the number of the straightening vanes and the quantity of water dispersed in the oil phase is partially squeezed and concentrated on the wall surfaces or on the wall surfaces of the respective straightening vanes in frictional contact with the oil phase. Consequently, the thin water layers are formed in the fats and oils emulsifying food. Particularly when the plate-like straightening vane having a difference in level in its cross-section is used, the cavity is formed between each pair of adjacent fats and oils separated by each split section layer of the groove is formed on outer surface of the product along each split section layer. This allows a knife or the like to be inserted into the cavity or the groove and thereby the product can be easily split.

The cross-sectional area of the nozzle at its outlet may be the same as the cross-sectional area at its body. When the nozzle outlet cross-sectional area is dimensioned to be slightly smaller than the cross-sectional area of the of the nozzle body, the water-in-oil type emulsifying fats and oils food divided by the straightening vanes and formed on their sections with the thin water layers will be seemingly tightened as it passes through the nozzle outlet. However, such a tightening effect does not occurred when the nozzle outlet cross-sectional area is substantially same as the nozzle body cross-sectional area. In this case, forcible shaping and tightening may be utilized owing to a manner of packaging.

Also when a pipe without any straightening vane or a multipipe is used as the nozzle, said shear rate of $4.0\ s^{-1}$ or higher should be maintained. By maintaining such shear rate, a shear rate distribution in a concentric circle is generated by a frictional contact between the water-in-oil type emulsifying fats and oils food and the wall surface of the pipe, and consequently a plurality of the thin water layers are formed within the water-in-oil type emulsifying fats and oils food. Specifically, the oil phases and the thin water layers are alternately formed like Baum Cuchen in the water-in-oil type emulsifying fats and oils food extruded in the circular form.

The water-in-oil type emulsifying fats and oils food manufactured by the method as has been described above will be wrapped with parchment paper after a shaping process and then packed in a carton if it is of the hard type, or packed in a cup-shaped container if it is of the soft type. Particularly when the water-in-oil type emulsifying fats and oils food of soft type is packed in the cup-shaped container, the thin water layers are arranged at random and such feature is suitable for split use of the product. A product is usually refrigerated at about 5° C., and the thin water layers can be maintained by this refrigeration without apprehension that the quantity of water forming these thin water layers might be concentrated in one and same location or exude out to the exterior of the product. When the water-in-oil type emulsifying fats and oils food is frozen at a temperature lower than −10° C., the thin water layers are further stabilized and this stabilized state can be maintained even after the product has been thawed. It is believed the reason is that the quantity of water forming the thin layers are solidified to become ice and increases its volume while the fats and oils crystallize and reduce their volume.

It should be understood that a frozen state raises no problem because the product can be easily split even if a frozen state has been maintained immediately before use of the product.

At said shear rate lower than $4.0\ s^{-1}$, the quantity of water dispersed in the oil phase can not be squeezed so as to be locally concentrated, and consequently the thin water layers can not be formed. At said shear rate of $150\ s^{-1}$ or higher, the crystal structure of fats and oils may change and the product may be swollen as soon as it is discharged from the nozzle into the atmosphere.

According to the invention, the shear rate can be given by formulae as follow, depending on the configurations of the nozzle means:

(1) for the square nozzle divided by the straightening vanes so as to present a square cross-section, $D=6\times Q/(w\times h^2)$ where D: share rate $(s^{-1})$, Q: flow rate $(cm^3/sec)$ of water-in-oil type emulsifying fats and oils food, W: long side (cm), h: short side (cm), and the shear rate value can be obtained at the smallest cross-sectional area of the outlets defined by the straightening vanes regardless of the particular shape of this outlet.

(2) in the case of a circulate pipe, $D=4\times Q/(\pi r^3)$, where D: shear rate $(s^{-1})$, Q: flow rate $(cm^3/sec)$, r: radius (cm) of the pipe, and the shear rate value can be obtained from each pipe, innermost pipe in the case of the coaxial multipipe. For the cross-sectional shape defined by the straightening vanes being penta- or higher polygonal, an equivalent diameter of the narrowest outlet may be determined on the basis of which a shear rate value can be approximately obtained from the formula for the circular pipe.

The water-in-oil type emulsifying fats and oils food manufactured by the method as has been described above can be readily split along the split section layers composed of the thin water layers formed therein even when the product is at a low temperature (in order of 5° C.) immediately after it has been taken out from the refrigerator in the form of a block.

While butter, margarine or spread in the form of a block is conventionally left until it attains an appropriate high temperature and split into desired shape and size, the water-in-oil type emulsifying fats and oils food provided by the invention need not to be waited for rising of the temperature. Accordingly, the food can be readily split even when it is taken out from a refrigerator immediately before use, and prevention of deterioration in quality and improvement of productivity are attained.

Also the method of manufacturing such water-in-oil type emulsifying fats and oils food having the split section layers is practically effective in that the split section layers composed of the thin water layers can be easily formed within the food merely by extrusion at a shear rate higher than the specified value.

BRIEF DESCRIPTION OF THE DRAWINGS

Details of the invention will be more fully understood from the following description made with respect to the accompanying drawings, in which.

MOST PREFERRED MANNER FOR IMPLEMENTATION OF THE INVENTION

The invention will be described more in detail with respect to several embodiments of the invention.

EXAMPLE 1

Figure 1:
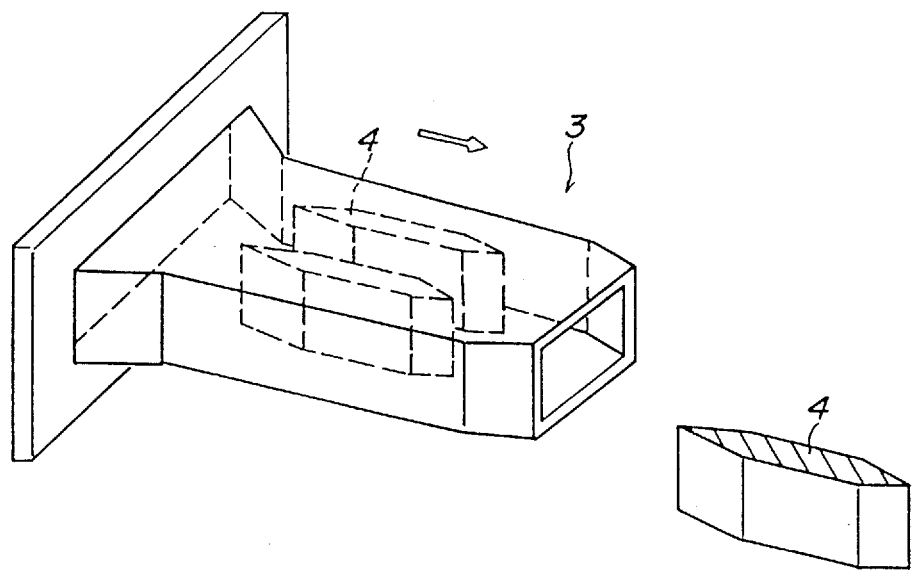
FIG. 1 is a perspective view showing a processing nozzle together with a straightening vane.
Figure 2:
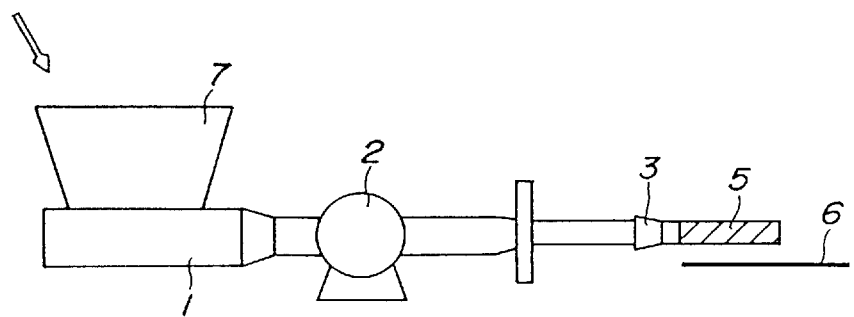
FIG. 2 is a diagram illustrating a processing system for division of the product.

Fluid salt-containing butter (product temperature of 15° C.) was supplied to a hopper (7) of a screw feeder (1) shown by FIG. 2, and butter (5) was extruded from a processing nozzle (3) under the action of a pump (2). At this point, the flow rate of butter was 150 kg/h (44.8 cm$^3$/sec). This system was provided at its forward end with said processing nozzle (3). The nozzle (3) contained therein, as will be seen in FIG. 1, two rows of straightening vanes (4) arranged along a flow of butter's flow so as to exert a shear force upon butter (5) and spaced from each other by a constant distance. The side wall of the nozzle was spaced from the adjacent straightening vane by 10 mm and the one straightening vane was spaced from the other straightening vane also by 10 mm. Each section divided by the respective nozzle side walls and the respective straightening vanes presented at the narrowest cross-section a rectangle defined by long sides each of 25 mm and short sides each of 10 mm. Passing through the nozzle, butter was divided into three and therefore the flow rate in each section was 14.93 cm$^3$/sec. A shear rate D generated between the nozzle side wall and the adjacent straightening vane as well as between the straightening vanes was determined from the following formula:

$$D=6\times 14.93/(2.5\times 1^2)=35.8\ s^{-1}.$$

Butter (5) extruded through this nozzle was cut into a length of approximately 100 mm and wrapped with trapping paper (6). This was stored in a refrigerator at a temperature of −20° C. until it was completely frozen. Then, this butter was stored in a refrigerator maintained at a temperature of 5° C. for two days and thereby thawed. This butter was cut in a thickness of approximately 20 mm at a right angle to the direction of the butter's flow during manufacturing Two split section layers formed by said straightening vanes (4) could not be clearly recognized by visual check. However, this butter (5) was sharply and easily split along these two split section layers as it was held and curved by both hands.

The same test conducted after this butter had been stored at a temperature of 5° C. for a month indicated that this butter also can be easily split.

EXAMPLE 2

Figure 3:
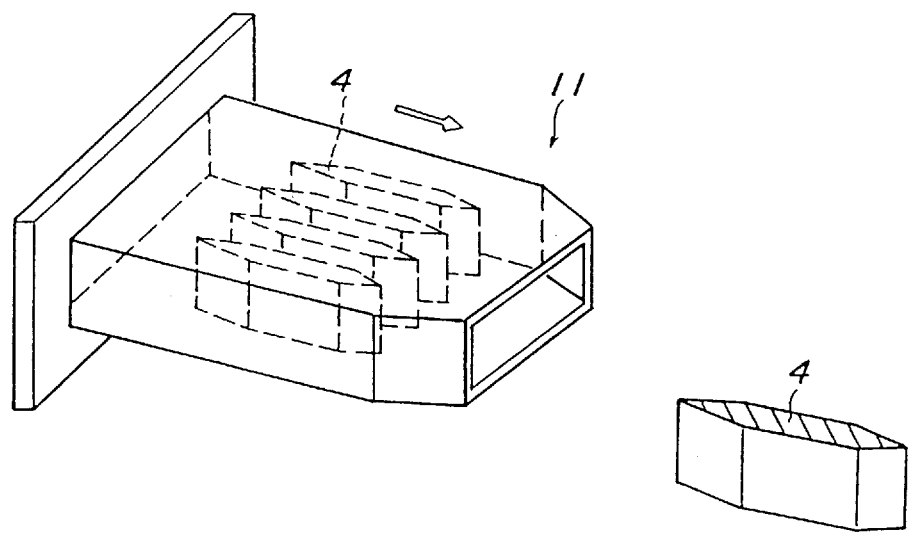
FIG. 3 is a perspective view showing a processing nozzle different from that shown by FIG. 1 together with a straightening vane.
Figure 4:
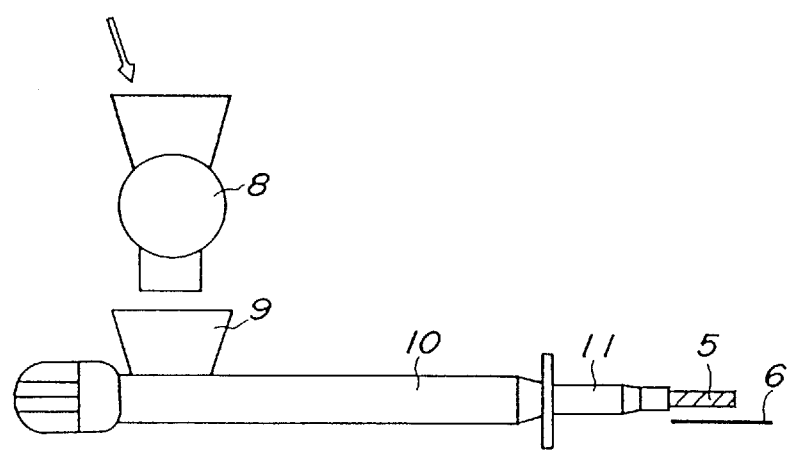
FIG. 4 is a diagram illustrating a processing system for division of the product different from that shown by FIG. 2.

Salt-free butter manufactured by the conventional method and stored at a temperature of −10° C. was directly crushed by a crusher (8) as shown by FIG. 4 into a thumb-size, and fed into a biaxial extruder (10) also shown by FIG. 4. Then, such crushed butter was kneaded under pressure and extruded by the biaxial extruder (10). At this point, the flow rate of butter (5) was 300 kg/h (90 cm$^3$/sec). The biaxial extruder (10) is provided at its forward end with a processing nozzle (11). The nozzle contained, as will be seen in FIG. 3, four rows of straightening vanes (4) arranged along a direction butter's flow so as to exert a shearing force upon butter and spaced one from another by a constant distance. The nozzle side wall was spaced from the adjacent straightening vane by 6 mm and each pair of adjacent straightening vanes were spaced from each other also by 6 mm. Each section divided by the respective nozzle walls and the respective straightening vanes presented at its narrowest cross-section a rectangle defined by long sides each of 25 mm and short sides each of 6 mm. Passing through the nozzle, butter was divided into five and therefore the flow rate of each section was 18 cm$^3$/sec. The shear rate generated during this processing between the nozzle side wall and the adjacent straightening vane as well as between each pair of adjacent straitening vanes was given by the following formula:

$$D=6\times 18/(2.5\times 0.6^2)\approx 120\ s^{-1}.$$

Butter (5) extruded from this nozzle was cut into a length of approximately 100 mm, then wrapped with wrapping paper (6) and stored at a temperature of 5° C. for 24 hours. Thereafter, butter was stored in a refrigerator maintained at a temperature of −20° C. until it was completely frozen. This butter was stored in a refrigerator maintained at a temperature of 5° C. for two days until it was thawed. Then, this butter was cut into a thickness of approximately 20 mm at a light angle to the direction of the flow of butter during its manufacturing. Four split section layers formed by said straightening vanes could not be clearly recognized by visual check, but this butter could be easily split as it was held and curved with both hands.

The same test conducted after this butter had been stored at a temperature of 10° C. for a week indicated that this butter also can be easily split.

EXAMPLE 3

Figure 5:
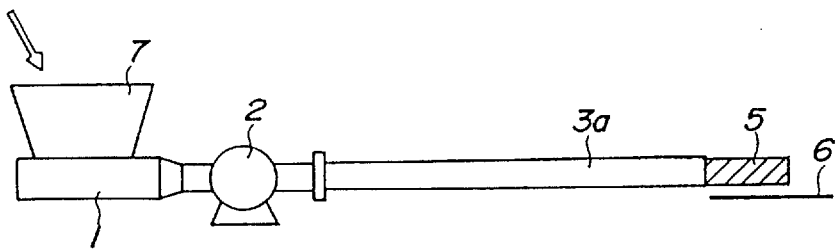
FIG. 5 is a diagram illustration still another processing system for division of the product different from that shown by FIG. 2.
Figure 6:
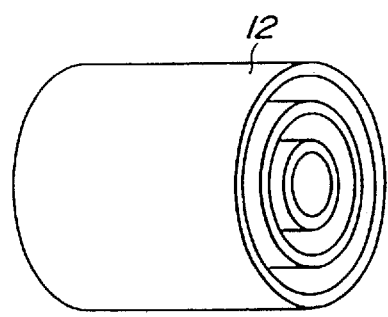
FIG. 6 is a perspective view showing a processing pipe arrangement comprising a combination of plural pipes.
Figure 7:
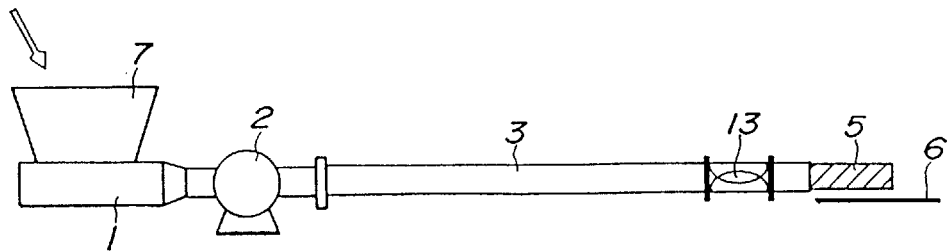
FIG. 7 is a diagram illustrating a processing system for division of the product provided with a static mixer.

Fluid salt-containing butter (product temperature of 14° C.) manufactured by the conventional method was supplied into the hopper (7) of the screw feeder (1) shown by FIG. 5 and extruded under the action of the pump (2). At this point, the flow rate of butter (5) was 1000 kg/h (300 cm/sec). The pump is provided at its outlet with a pipe (3a) of a length of 3 inches (inner diameter of 72 mm). A shear rate D generated when this butter passes through the pipe was given by the following formula:

$$D=4\times 3/(\pi\times 3.6^3)\approx 8.2\ s^{-1}.$$

This butter (5) extruded through the pipe was cut into a length of approximately 300 mm, wrapped with wrapping paper(6) and stored in a refrigerator maintained at a temperature of −20° C. until it was completely frozen. Then, this butter was stored in a refrigerator maintained at a temperature of 5° C. for two days until it was thawed. The butter was cut into a thickness of approximately 15 mm at a right angle to the direction of the flow of butter during its manufacturing. This piece of butter was held and curved with both hands and could be easily split into flake-like pieces in concentric circles.

The same test conducted after this butter had been stored at a temperature of 5° C. for a month indicated that the butter also an be easily split.

EXAMPLE 4

The system used in EXAMPLE 1 and the nozzle used in EXAMPLE 2 were used for extrusion processing of hard type margarine manufactured from hydrogenated bean oil as a main material by the conventional method and stored at a temperature of 5° C.

Margarine adjusted at a product temperature of 8° C. was supplied into the hopper (7) of the screw feeder (1) shown by FIG. 2 and then extruded under the action of the pump (2). At this point, the flow rate of margarine was 500 kg/h (150 cm³/sec). The flow rate of margarine passing through each section defined by the respective nozzle side walls and the respective straightening vanes was 30 cm³/sec. The shear rate generated during this processing between the nozzle side wall and the adjacent straightening vane as well as between each pair of adjacent straightening vanes was given from the following formula:

$$D=6\times30/(2.5\times0.6^2) \leq 200 \ s^{-1}.$$

Margarine extruded through this nozzle was cut into a length of approximately 150 mm, wrapped with wrapping paper (6) and stored in a refrigerator maintained at a temperature of −20° C. until it was completely frozen. Then, this margarine was stored in a refrigerator maintained at a temperature of 5° C. for two days until it was thawed. The margarine was cut into a thickness of approximately 15 mm at a right angle to the direction of flow of margarine during its manufacturing. Four split section layers formed by said straightening vanes could not be clearly recognized by visual check. However, the piece cut from this margarine could be easily split along said four split section layers by holding and curving this with both hands.

EXAMPLE 5

Figure 8:
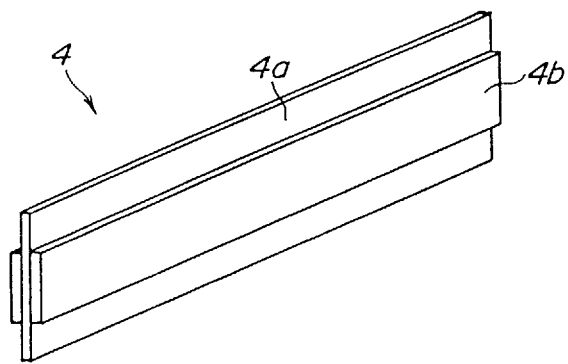
FIG. 8 is a perspective view showing a variant of the straightening vane.

Fluid salt-containing butter (product temperature of 14° C.) manufactured by the conventional method was supplied into the hopper (7) of the screw feeder (1) shown by FIG. 2 and then extruded through the nozzle (3) under the action of the pump (2). At this point, the flow rate of this butter was 360 kg/h (108 cm³/sec). This system is provided at its forward end with said processing nozzle (3). The nozzle (3), as will be seen in FIG. 8, has nine rows of plate-like straightening vanes (4) arranged at a regular interval in alignment with the few of butter (5) so as to exert a shearing force upon the butter. Each of the straightening vanes (4) presented a cross-section having projections on both sides at the vertically middle level. Passing through the nozzle, the butter was divided in ten and therefore the flow rate at each section was 10.8 cm³/sec.

The maximum distance between the nozzle side wall and the adjacent straightening vane as well as between each pair of adjacent straightening vanes was dimensioned to be 12 mm. The inner side wall of the nozzle was dimensioned to have a height of 25 mm. Strictly, each section is not rectangular but, for convenience, its cross-section was regarded as a rectangle defined by long sides each of 25 mm and short sides each of 12 mm on the assumption that the straightening vanes have no difference in level in their cross-sections. The shear rate generated during this processing in the maximum space between the nozzle side wall and the adjacent straightening vane as well as between each pair of adjacent straightening vanes was approximated from the following formula:

$$D=6\times10.8/(2.5\times1.2^2)=18 \ s^{-1}.$$

Figure 9:
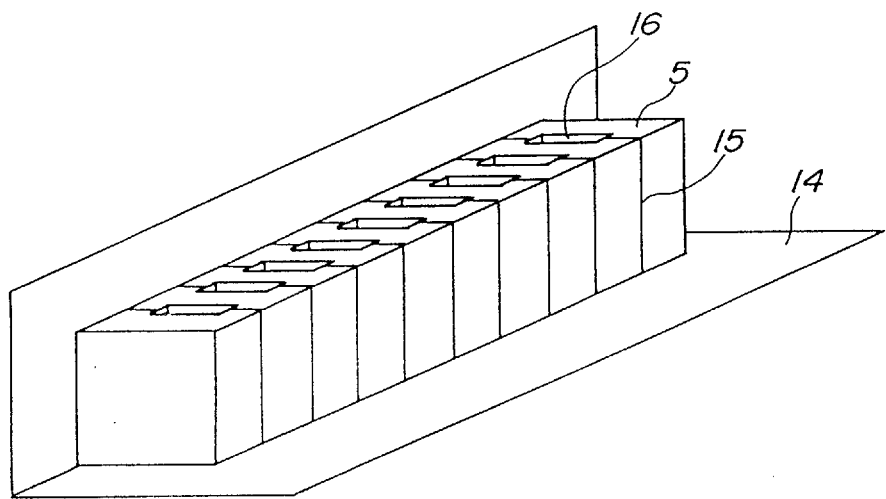
FIG. 9 is a diagram illustrating the product formed by using the straightening vanes shown by FIG. 8.

The butter extruded through this nozzle was formed between each pair of adjacent fats and oils separated by each split section layer (15) with a cavity (16) as has been shown by FIG. 9. This butter was cut into a length of 30 mm, wrapped with wrapping paper (14) and then stored in a refrigerator maintained at a temperature of −10° C. until it was completely frozen. Thereafter, this butter was stored in a refrigerator maintained at a temperature of 5° C. for two days until it was thawed. The butter could be easily split along the split section layer (15) by inserting a knife into the upper cavity (16).

Formation of the cavity between each pair of adjacent fats and oils separated by each split section layer was a result of the function of the straightening vanes each presenting its cross-section formed with a projection, i.e., a difference in level on each side fully extending in the direction of butter's flow.

EXAMPLE 6

Figure 10:
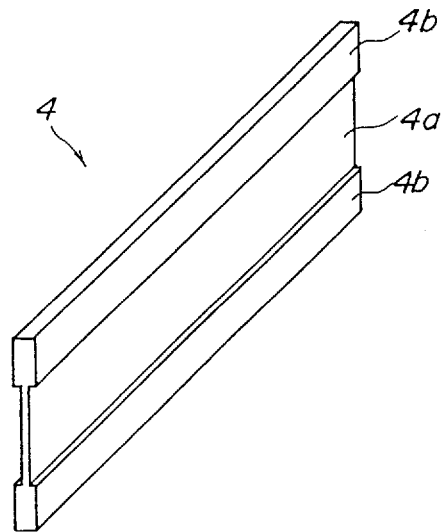
FIG. 10 is a perspective view showing still another variant of the straightening value different from that shown by FIG. 8.

Fluid salt-containing butter (product temperature of 14° C.) manufactured by the conventional method was supplied into the hopper (7) of the screw feeder (1) shown by FIG. 2 and then the butter (5) was extruded through the nozzle (3) under the action of the pump (2). At this point, the flow rate of the butter was 360 kg/h (108 cm³/sec). The system is provided at its forward end with the processing nozzle (3). The nozzle (3) contained therein, as will be seen in FIG. 10, four rows of plate-like straightening vanes (4) arranged at regular intervals in alignment with the direction of the flow of butter so as to exert a shearing force upon the butter. Each of the straightening vanes presented a cross-section formed at the top and bottom with paired projections, i.e., differences in level. Passing through the nozzle, the butter was divided into five and therefore the flow rate for each section was 21.6 cm³/sec.

The maximum distance between the nozzle side wall and the adjacent straightening vane as well as between each pair of adjacent straightening vanes was dimensioned to be 15 mm. The inner side wall of the nozzle was dimensioned to be 25 mm high. In view of a fact that each section is not strictly rectangular, it was assumed that the straightening vanes have no differences in level and the section was regarded as a rectangle defined by long sides each of 25 mm and short sides each of 15 mm, so far as the section was relatively wide. A shear rate D generated during this processing in the widest spaces between the nozzle side wall and the adjacent straightening vane as well as between each pair of adjacent straightening vanes was approximated as follows:

$$D=6\times21.6/(2.5\times1.5^2)=23 \ s^{-1}.$$

Figure 11:
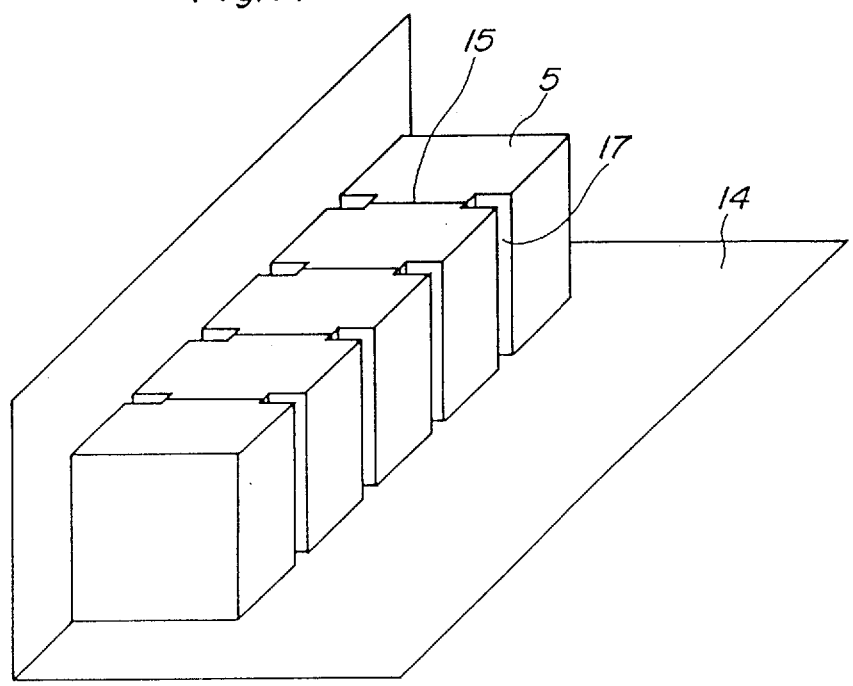
FIG. 11 is a diagram illustrating the food formed with grooves on both side surfaces by using the straightening vanes shown by FIG. 10.
Figure 12:
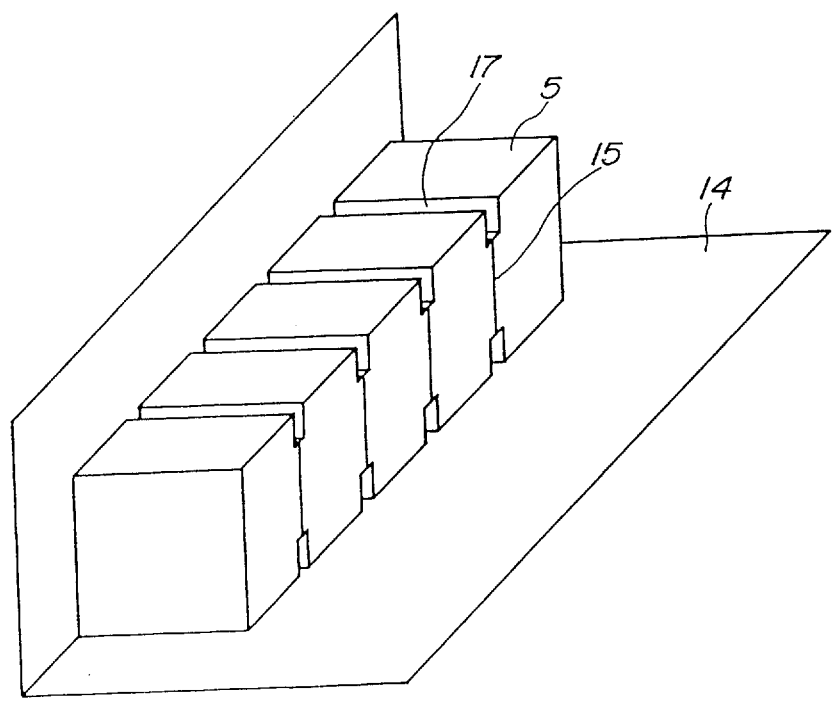
FIG. 12 is a diagram illustrating the food formed with said grooves on the top and bottom side surfaces.

The butter extruded through this nozzle was formed on its outer surface with grooves (17) extending along the split section layer (15) separating each pair of adjacent fats and oils, as shown by FIG. 11 . The product was cut into a length of 30 mm, wrapped with wrapping paper (14) and stored in a refrigerator maintained at a temperature of −15° C. until it was completely frozen. Thereafter, this butter was stored in a refrigerator maintained at a temperature of 5° C. for two days until it was thawed. The product could be easily split along the split section layer (15) by inserting a knife into the upper groove (17) as shown by FIG. 12.

Formation of the grooves on outer surface of the product along the respective split section layers separating the respective pairs of adjacent fats and oils is a result of the function of the straightening vanes each presenting at the top and bottom in its cross-section the projections fully extending in both sides of each straightening vane in the direction of butter's flow. As these grooves were formed in both the top and the bottom sides, the grooves are always present no matter which side lies on wrapping paper and ready for insertion of the knife or the like. Also when the butter is laid so that the grooves may appear on a lateral side, the butter can be easily split by inserting chopsticks into the groove.
Industrial Usefulness:

The invention allows the split section layers to be easily formed within water-in-oil type emulsifying fats and oils food merely by extruding the food at a shear rate higher than a specified value.

The conventional water-in-oil type emulsifying fats and oils food presents a state of hard block immediately after it has been taken out from the refrigerator. Accordingly, operation of dividing or partially cut off this hard block for actual use of the food has been accompanied with a somewhat annoying labor. To avoid this, the product had previously been taken out from the refrigerator and left at a room temperature before it attains a softness suitable for use. However, such practice has necessarily been accompanied with the problem of decrease in utility as well as work efficiency and deterioration in quality.

On the contrary, the water-in-oil type emulsifying fats and oils food provided by the invention can be readily split along the sprit section layers composed of the thin water layers formed therein even when it is taken out from a refrigerator immediately before use. Accordingly, the water-in-oil type emulsifying fats and oils food of the invention is not only excellent in utility as well as work efficiency but also useful for prevention of deterioration in quality because it is unnecessary to leave the product at a room temperature before use.

What is claimed is:

1. Water-in-oil type emulsifying fats and oils food, comprising a plurality of adjacent split section layers of the food and thin water layers between each layer of the food, wherein the layers of the food can be easily split along each of the thin water layers.

2. Water-in-oil type emulsifying fats and oils food according to claim 1, wherein there is a cavity between adjacent split section layers of the food.

3. Water-in-oil type emulsifying fats and oils food according to claim 1, wherein there is a groove on an outer surface of adjacent layers of the food.

4. Water-in-oil type emulsifying fats and oils food according to claim 1, wherein said water-in-oil type emulsifying fats and oils food comprises cooking fats and oils, table fats and oils or fats and oils as raw material.

5. A method of manufacturing a water-in-oil type emulsifying fats and oils food comprising extruding said food through a nozzle having at least one straightening vane therein so as to produce a shear rate of the food in the nozzle of at least 4.0 s$^{-1}$, whereby a quantity of water in the food is extricated from the food and concentrated on wall surfaces of the straightening vanes so as to form said thin water layers between layers of the food.

6. Method of manufacturing the food according to claim 1, further comprising a step of freezing the food extruded through said nozzle.

7. Method of manufacturing the food according to claim 1, where said nozzle is a square nozzle.

8. Method of manufacturing the food according to claim 1, wherein said nozzle is a square nozzle comprising a polygonal body, an outlet having a cross-section smaller than a cross-section of a body of said nozzle and straightening vanes arranged within said nozzle.

9. Method of manufacturing the food according to claim 1, wherein said nozzle is a square nozzle containing straightening vanes and presenting a rectangular cross-section; and wherein said extruding process provide a shear rate (D) given by the following formula:

$$D=6\times Q/(w\times h^3)$$

where D: shear rate (s$^{-1}$), Q: flow rate (cm$^3$/sec) of water-in-oil type emulsifying fats and oils food, W: long side (cm), and h: short side (cm).

10. Method of manufacturing the food according to claim 1, wherein said nozzle is a pipe or multipipe or a circular nozzle containing the straightening vanes.

11. Method of manufacturing the food according to claim 1, wherein said nozzle is a circular nozzle provided therein with a spiral straightening vane.

12. Method of manufacturing the food according to claim 1, wherein said nozzle is a circular pipe, or a nozzle having an equilateral polygonal cross-section which can be approximate as a circular cross-section and contains straightening vanes; and wherein said extruding process provides a shear rate (D) given by the following formula:

$$D=4\times Q/(\pi r^3)$$

r: diameter (cm) of pipe or substantially equilateral polygon.

13. Method of manufacturing the food according to claim 1, wherein the straightening vane is in the form of a plate presenting a different cross-section at vertical locations of the vane.

14. Method of manufacturing the food according to claim 13, wherein said straightening vane contained within the nozzle is in the form of a plate comprising a main plate member (4a) and a pair of relatively narrow plate members (4b) assembled to said main plate member (4a) at a vertically middle location thereof on both sides.

15. Method of manufacturing the food according to claim 14, wherein said straightening vane contained within the nozzle is in the form of a plate comprising a main plate member (4a) and a pair of relatively narrow plate members (4b) assembled to said main plate member (4a) at top and a bottom thereof on both sides.

16. Method of manufacturing the food according to claim 1, wherein said straightening vane is in the form of a prismatic pillar or a substantially cylindrical pillar.

* * * * *